United States Patent
Tsuji et al.

(10) Patent No.: US 8,446,114 B2
(45) Date of Patent: May 21, 2013

(54) CONTROL APPARATUS FOR ELECTRIC ROTATING MACHINE

(75) Inventors: Hiroya Tsuji, Yokkaichi (JP); Tatsuru Morioka, Okazaki (JP); Hiroshi Inamura, Nagoya (JP); Takahumi Oowada, Kariya (JP)

(73) Assignee: Denso Corporation, Kariya (JP)

( * ) Notice: Subject to any disclaimer, the term of this patent is extended or adjusted under 35 U.S.C. 154(b) by 233 days.

(21) Appl. No.: 13/035,119

(22) Filed: Feb. 25, 2011

(65) Prior Publication Data
US 2011/0210687 A1 Sep. 1, 2011

(30) Foreign Application Priority Data

Feb. 26, 2010 (JP) ................................. 2010-041754
Jan. 14, 2011 (JP) ................................. 2011-005611

(51) Int. Cl.
*H02P 21/00* (2006.01)
*H02P 21/14* (2006.01)

(52) U.S. Cl.
USPC .............. 318/400.02; 318/400.3; 318/400.33; 318/722; 318/729

(58) Field of Classification Search
USPC .................... 318/400.02, 400.3, 400.33, 722, 318/729, 801, 400.15
See application file for complete search history.

(56) References Cited

U.S. PATENT DOCUMENTS

| 6,069,808 | A * | 5/2000 | Panahi et al. ................... 363/98 |
| 6,771,039 | B2 * | 8/2004 | Sakurai et al. ................ 318/722 |
| 7,173,393 | B2 * | 2/2007 | Maeda et al. ............ 318/400.02 |
| 7,411,369 | B2 * | 8/2008 | Maeda et al. .................. 318/801 |
| 7,671,557 | B2 * | 3/2010 | Maeda et al. .................. 318/729 |
| 7,696,730 | B2 * | 4/2010 | Tamai et al. ................... 323/217 |
| 2003/0128009 | A1 * | 7/2003 | Sakurai et al. ................ 318/722 |
| 2004/0169488 | A1 * | 9/2004 | Maeda et al. .................. 318/801 |
| 2004/0232875 | A1 * | 11/2004 | Youm ........................... 318/801 |
| 2005/0062451 | A1 * | 3/2005 | Takemori et al. .............. 318/685 |
| 2005/0174090 | A1 * | 8/2005 | Hayashi ........................ 318/807 |
| 2006/0179859 | A1 * | 8/2006 | Nakata et al. ................. 62/228.1 |
| 2007/0114966 | A1 * | 5/2007 | Maeda et al. .................. 318/811 |
| 2007/0200529 | A1 * | 8/2007 | Kaneko et al. ................ 318/801 |
| 2007/0229010 | A1 * | 10/2007 | Tsuji et al. ..................... 318/432 |
| 2008/0055955 | A1 * | 3/2008 | Tamai et al. ................... 363/163 |
| 2008/0061727 | A1 * | 3/2008 | Tomigashi .................... 318/768 |
| 2008/0180056 | A1 * | 7/2008 | Maeda et al. .................. 318/729 |
| 2008/0218111 | A1 * | 9/2008 | Okamura ...................... 318/453 |
| 2009/0121669 | A1 * | 5/2009 | Hanada ......................... 318/504 |

(Continued)

FOREIGN PATENT DOCUMENTS

| JP | 09-070196 | 3/1997 |
| JP | 3801731 | 5/2006 |

*Primary Examiner* — Paul Ip
(74) *Attorney, Agent, or Firm* — Nixon & Vanderhye PC

(57) ABSTRACT

A control apparatus for use with an electric power conversion system which is equipped with a dc/ac converter connected to an electric rotating machine and a capacitor joined to input terminals of the dc/ac converter. The control apparatus stores an angle of rotation (i.e., start angle θ0) of the electric rotating machine before start of control of energization of the electric rotating machine to discharge the capacitor and determines command currents idr and iqr which will result in zero (0) torque in the electric rotating machine. The control apparatus includes a command current correcting circuit which corrects the command currents idr and iqr by a difference between a current angle θ of rotation of the electric rotating machine and the start angle θ0, thereby avoiding constant rotation of the electric rotating machine when the capacitor is discharged.

19 Claims, 6 Drawing Sheets

U.S. PATENT DOCUMENTS

| | | | |
|---|---|---|---|
| 2009/0160376 A1* | 6/2009 | Yamada | 318/400.02 |
| 2009/0160377 A1* | 6/2009 | Yamada | 318/400.02 |
| 2009/0237021 A1* | 9/2009 | Yamamoto et al. | 318/400.15 |
| 2009/0237022 A1* | 9/2009 | Yamamoto et al. | 318/400.26 |
| 2009/0267550 A1* | 10/2009 | Hida et al. | 318/400.15 |
| 2009/0322264 A1* | 12/2009 | Imura | 318/400.09 |
| 2010/0045218 A1* | 2/2010 | Tomigashi | 318/400.02 |
| 2010/0060211 A1* | 3/2010 | Hashimoto et al. | 318/400.02 |

* cited by examiner

CONTROL APPARATUS FOR ELECTRIC ROTATING MACHINE

CROSS REFERENCE TO RELATED DOCUMENT

The present application claims benefits of Japanese Patent Application No. 2010-41754 filed on Feb. 26, 2010 and Japanese Patent Application No, 2011-5611 filed on Jan. 14, 2011, disclosures of which are incorporated herein by reference.

BACKGROUND

1. Technical Field

The present invention relates generally to a control apparatus for use with an electric power conversion system which is equipped with a dc/ac converter connected to an electric rotating machine and a capacitor joined to input terminals of the dc/ac converter, and more particularly to such a control apparatus designed to control an operation of the dc/ac converter so as to decrease the voltage charged in the capacitor below a given level.

2. Background Art

Japanese Patent First Publication No. 9-70196 discloses a control apparatus designed to control energization of a three-phase permanent-magnet electric motor so as to set a command current in a q-axis direction to zero (0) and an absolute value of a command current in a d-axis direction to more than zero (0), thereby discharging a capacitor connected to an inverter. This manner of control is based on the fact that the torque T to be produced by the motor is expressed by $T=p\{\psi+(Ld-Lq)id\cdot iq\}$ where id is a d-axis current, iq is a q-axis current, Ld is a d-axis inductance, $\psi$ is a coefficient of flux linkage of an armature of the motor, and p is the number of pairs of poles of the motor. Specifically, the phase of current to energize the motor (which will also be referred to below as a motor-energizing current) is oriented to the d-axis in order to avoid the generation of torque upon the energization of the motor.

The control of energization of the motor to set the command current to zero (0) requires use of a measured value of an electrical angle of the motor. If the measured value has an error, the orientation of the phase of the motor-energizing current to the d-axis based on the measured value may result in generation of torque in the motor. When the motor is rotated by such torque, it will cause the phase of the motor-energizing current continues to be oriented to the d-axis, as defined in error. The motor, thus, continues to produce the torque, in other words, to rotate.

Additionally, the factor that the torque does not become zero (0) is also attributed to an error in the above torque equation. Specifically, the torque equation is derived in a simplified motor model wherein the values of the d-axis inductance Ld and the q-axis inductance Lq are fixed. Typical electric motors, however, have an inductance component which arises from the space harmonics and is dependent on the electrical angle of the motor. This may cause the torque to be produced undesirably even when the phase of the motor-energizing current is oriented to the d-axis in the control of energization of the motor. Such a problem is becoming serious with an increase in use of permanent magnet motors equipped with concentrated windings in which the space harmonics will appear strongly.

SUMMARY

It is therefore an object to provide a control apparatus for use in an electric rotating machine which is designed to decrease the voltage charged in a capacitor coupled to input terminals of a dc/ac converter below a given value.

According to one aspect of an embodiment, there is provided a control apparatus for use with an electric power conversion system which is equipped with a dc/ac converter connected to an electric rotating machine and a capacitor joined to input terminals of the dc/ac converter. The control apparatus comprises: (a) an energizing controlling circuit that controls energization of the electric rotating machine through the dc/ac converter to discharge the capacitor so as to have a charged voltage lower than a given value; and (b) a current vector change control circuit that controls a change in direction of a vector of current in a fixed coordinate system which flows through the electric rotating machine. The change arises from a change in rotation angle of the electric rotating machine during control of the energization of the electric rotating machine.

The torque developed by control of energization of the electric rotating machine may cause the electric rotating machine to rotate. When the direction of the vector of current in the fixed coordinate system is changed to fix the phase of current provided to energize the electric rotating machine, it may cause the torque continues to be produced in the electric rotating machine. Alternatively, when the direction of the vector of current in the fixed coordinate system is fixed, it will cause the torque to be produced in a direction opposite that in which an angle of rotation of the electric rotating machine is changing. The control apparatus is designed based on such a fact and operable to control or decrease in a robust control mode a change in direction of the vector of current in the fixed coordinate system which flows through the electric rotating machine in the control of energization of the electric rotating machine.

In the preferred mode of the embodiment, the energization controlling circuit includes a voltage determining circuit which works to determine a command voltage to be applied to a stator of the electric rotating machine based on the rotation angle of the electric rotating machine so as to control the direction of the vector of the current in an open loop mode. The energization controlling circuit controls the dc/ac converter through the command voltage. The current vector change control circuit serves as a command voltage fixing circuit working to fix a value of the rotation angle of the electric rotating machine that is an input parameter of the voltage determining circuit.

The value of the rotation angle of the electric rotating machine to be inputted to the voltage determining circuit is sampled before the start of control of the energization of the electric rotating machine, thereby preventing the direction of the vector of current flowing through the electric rotating machine in the fixed coordinate system from being altered by a change in angle of rotation of the electric rotating machine. The use of the open-loop mode facilitates the ease of decreasing noise or vibration occurring due to the discharging of the capacitor or simplifying a control logic for the capacitor.

The energization controlling circuit starts controlling the energization of the electric rotating machine when a condition where the electric rotating machine is stopped is met. The command voltage fixing circuit samples a value of the rotation angle of the electric rotating machine before start of control of the energization of the electric rotating machine through the energizing controlling circuit. The voltage determining circuit works to change a phase of the voltage to be applied to the electric rotating machine as a function of the sampled value of the rotation angle of the electric rotating machine.

The phase of the current not producing the torque may depend upon the rotation angle of the electric rotating machine due to the space harmonics. The possibility that the phase of current at the start of control of the energization of the electric rotating machine will not contribute to production of torque is increased by changing or determining the phase of the voltage as a function of the sampled value of the rotation angle of the electric rotating machine.

The energization controlling circuit may include a command current determining circuit, a feedback controlling circuit, and a voltage transformer. The command current determining circuit works to determine command currents in, a rotating coordinate system. The feedback controlling circuit works to determine command voltages in the rotating coordinate system as controlled variables so as to bring components of current, as defined in the rotating coordinate system, which are actually flowing through the electric rotating machine into agreement with the command currents in a feedback mode. The voltage transformer works to transform the command voltages into a command voltage to be applied to a stator of the electric rotating machine through the dc/ac converter based on a measured value of the rotation angle of the electric rotating machine. The current vector change control circuit may be a command voltage corrector which corrects phases of the command currents to be inputted to the feedback controlling circuit in a direction opposite that in which a current value of the rotation angle of the electric rotating machine is changing relative to that at start of control of the energization of the electric rotating machine.

Specifically, the command voltage corrector serves to minimize the change in vector of the current due to a change in rotation angle of the electric rotating machine.

The command current determining circuit may work to change at least one of a phase or an amplitude of each of the command currents as a function of a value of the rotation angle of the electric rotating machine, as measured before start of control of the energization of the electric rotating machine.

The phase of the current not contributing to production of the torque may depend upon the rotation angle of the electric rotating machine or the amplitude of the current due to the space harmonics. The possibility that the phase of current will not contribute to production of torque is increased by changing or determining at least one of the phase and amplitude of each of the command currents as a function of the sampled value of the rotation angle of the electric rotating machine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
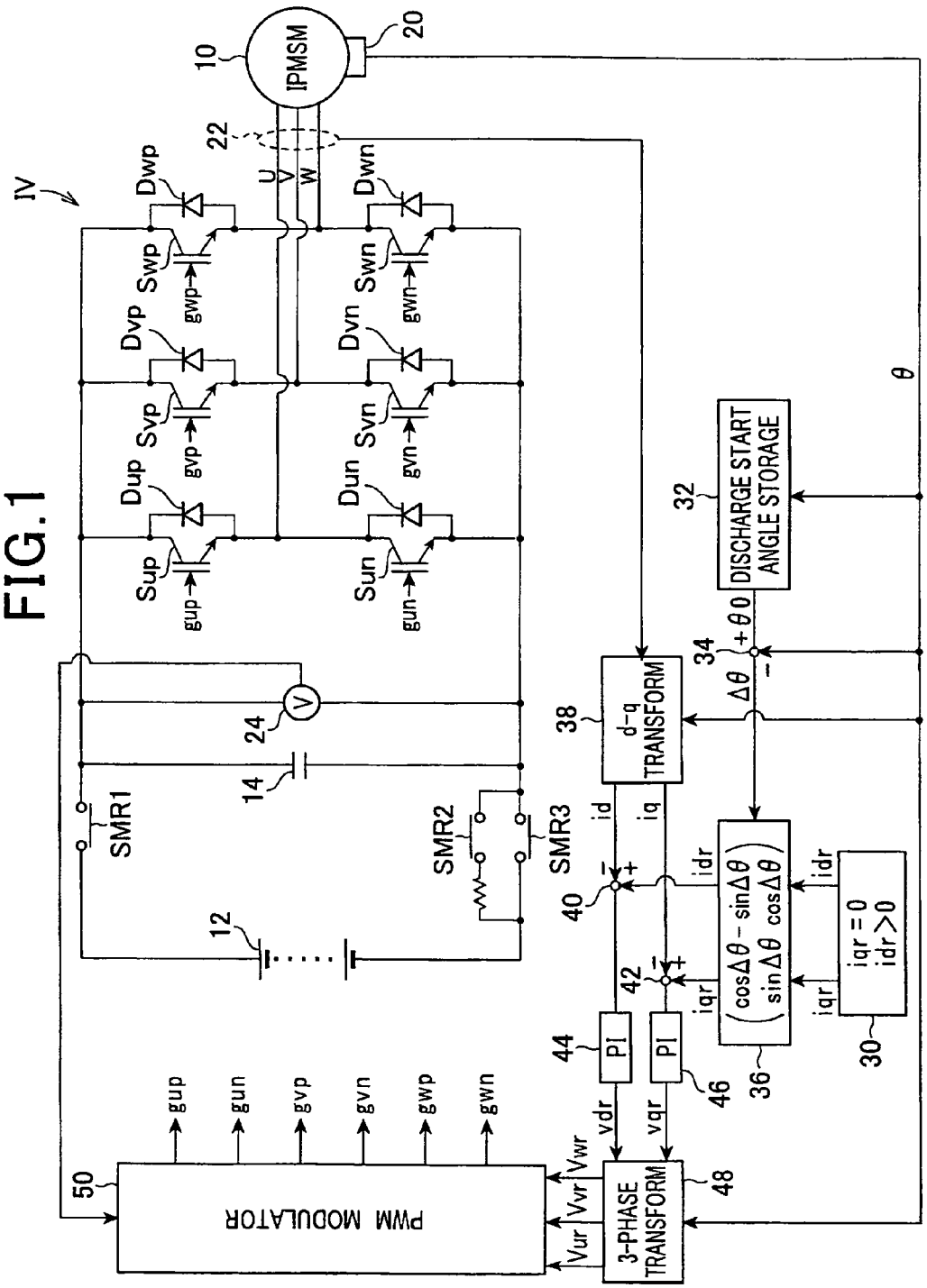
FIG. 1 is a circuit diagram which illustrates a control apparatus for an electric rotating machine according to the first embodiment which is used with a hybrid vehicle.

Referring to the drawings, wherein like reference numbers refer to like parts in several views, particularly to FIG. 1, there is shown a control apparatus for controlling an operation of a motor-generator 10 (i.e., an electric rotating machine) through an electric power conversion system according to the first embodiment. The motor-generator 10, as referred to herein, is installed in a hybrid vehicle.

The motor-generator 10 is a three-phase motor-generator and works as a main engine coupled to driven wheels of the vehicle. The motor-generator 10 is implemented by an interior permanent magnet synchronous motor (IPMSM) equipped with concentrated three-phase windings U, V, and W. The three-phase windings U, V, and W of the motor-generator 10 are, as can be seen from the drawing, connected to a high-voltage battery 12 (i.e., a secondary battery used as a dc power supply) through an inverter IV and relays SMR1, SMR2, and SMR3.

The inverter IV works as a dc/ac converter and is equipped with a first switching circuit made up of series-connected switches Sup and Sun, a second switching circuit made up of series-connected switches Svp and Svn, and a third switching circuit made up of series-connected switches Swp and Swn. A junction of the switches Sup and Sun is connected electrically to the U-phase winding. A junction of the switches Svp and Svn is connected electrically to the V-phase winding. A junction of the switches Swp and Swn is connected electrically to the W-phase winding. Each of the switches Sup, Sun, Svp, Svn, Swp, and Swn is implemented by an insulated gate bipolar transistor (IGBT). Diodes Dup, Dun, Dvp, Dvn, Dwp, and Dwn are connected in parallel to the switches Sup, Svn, Svp, Svn, Swp, and Swn, respectively.

The control apparatus also includes an angular position sensor 20, a current sensor 22, and a voltage sensor 24. The angular position sensor 20 works to measure an electric angle (i.e., a rotation angle θ) of the motor-generator 10. The current sensor 22 works to measure currents iu, iv, and iw flowing through the U-, V-, and W-phase windings of the motor-generator 10, respectively. The voltage sensor 24 works to measure the voltage developed between input terminals of the inverter IV.

A capacitor 14 is connected between the input terminals of the inverter IV, that is, between the relay SMR1 and the relays SMR2 and SMR3. The capacitor 14 is charged at as high a voltage as the high-voltage battery 12 when the relays SMR1 to SMR3 are in a closed state. A discharge control task to be executed to open the relays SMR1 to SMR3 to discharge the capacitor 14 will be described below. When it is required to discharge the capacitor 14, the control apparatus enters a capacitor-discharging mode to execute the discharge control task. The control apparatus constitutes a low-voltage system electrically insulated from a high-voltage system equipped with the high-voltage battery 12.

A command current determining circuit 30 works to determine a command current idr on the d-axis and a command current iqr on the q-axis in a rotating coordinate system (i.e., a d-q coordinate system). Specifically, the command current determining circuit sets the command current idr to be positive and the command current iqr to be zero (0). This setting is made to set phases of the command currents idr and iqr (i.e., differences in angle between themselves and a reference direction (e.g. the d-axis) in the rotating coordinate system) to phases expected to produce torque of zero (0). The torque T to be produced by an IPMSM (i.e., the motor-generator 10) is typically expressed by $$T = p\{\psi iq + (Ld - Lq) id \cdot iq\} \tag{c1}$$

where Ld is the d-axis inductance, Lq is the q-axis inductance, id is a d-axis current, iq is a q-axis current, ψ is a coefficient of flux linkage of an armature of IPMSM, and p is the number of pairs of poles of IPMSM.

It is found from Eq. (c1) that the torque T of zero (0) is produced when the q-axis current iq is zero (0).

A discharge start angle storage 32 stores therein a start angle θ0 that is an angle of rotation (i.e., an angular position) of the motor-generator 10 at the time when the capacitance 14 is required to be discharged. In this embodiment, the control apparatus starts to execute the discharge control task to discharge the capacitor 14 when the condition wherein the motor-generator 10 is at rest is encountered. The start angle θ0, therefore, indicates an angular position of the motor-generator 10 when being stopped.

An angle difference calculator 34 works to subtract the rotation angle θ of the motor-generator 10, as measured by the angular position sensor 20, from the start angle θ0 to calculate an angular difference Δθ. A command current corrector 36 works to correct or change the phases of the command current idr and iqr, as determined by the command current determining circuit 30, by the angular difference Δθ. Specifically, when the rotation angle θ of the motor-generator 10 is now changing relative to the start angle θ0, the command current corrector 36 changes the phases of the command currents idr and iqr by the same amount in a direction opposite that in which the rotation angle θ of the motor-generator 10 is changing relative to the start angle θ0.

A d-q transformer 38 works to transform in the three-phase current in a fixed coordinate system which is the current, as measured by the current sensor 22, into current components, i.e., the currents id and iq in the rotating coordinate system (also called the d-q coordinate system). A deviation calculator 40 works to subtract the current id from the command current idr on the d-axis to calculate a deviation of the current id from the command current idr. A deviation calculator 42 works to subtract the current iq from the command current iqr on the q-axis to calculate a deviation of the current iq from the command current iqr. A feedback controller 44 samples the output from the deviation calculator 40 to calculate a command voltage vdr on the d-axis for use in bringing the current id on the d-axis into agreement with the command current idr in a feedback mode. A feedback controller 46 samples the output from the deviation calculator 42 to calculate a command voltage vqr on the q-axis for use in bringing the current iq on the q-axis into agreement with the command current iqr in the feedback mode. The feedback controllers 44 and 46 are each made up of a proportional controller and an integrating controller.

A three-phase transformer 48 works to transform in a known manner the command voltage vdr and vqr into a U-phase command voltage Vur, a V-phase command voltage Vvr, and a W-phase command voltage Vwr based on an instantaneous value of the rotation angle θ of the motor-generator 10, as measured by the angular position sensor 20. The U-phase command voltage Vur, the phase command voltage Vvr, and the W-phase command voltage Vwr are voltages in the fixed coordinate system to be applied to the U-, V-, and W-phase windings (i.e., the stator) of the motor-generator 10. A PWM modulator 50 produces and outputs PWM signals to the inverter IV. The inverter IV develops and outputs to the motor-generator 10 three-phase output voltages which correspond to the command voltages Vur, Vvr, and Vwr. Specifically, the PWM modulator 50 converts results of comparison in magnitude between voltages that are derived by normalizing the command voltage Vur, Vvr, and Vwr by an input voltage at the inverter IV, as measured by the voltage sensor 24, and a triangular wave carrier into the PWM signals. The PWM signals are control signals gup, gun, gvp, gvn, gwp, and gwn for use in actuating the switches Sup, Sun, Svp, Svn, Swp, and Swn of the inverter IV. The operations of the PWM modulator 50 and the inverter IV are known, and explanation thereof in detail will be omitted here.

The d-q transformer 38, the deviation calculators 40 and 42, the feedback controllers 44 and 46, the three-phase transformer 48, and the PWM modulator 50 may be implemented by electric circuits typically engineered to calculate a controlled variable of the motor-generator 10 during running thereof. The gains of the feedback controllers 44 and 46 may be gains selected to control discharging of the capacitor 14.

The technical purpose of the operation of the command current corrector 36 will be described below.

Figure 2A:
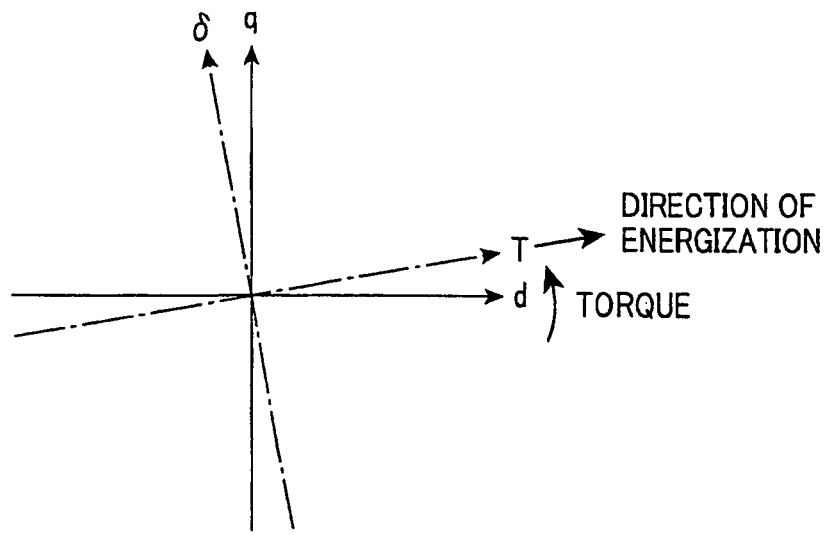
FIGS. 2(a) and 2(b) are views for explaining the technical purpose of an operation of a command current corrector installed in the control apparatus of FIG. 1.
Figure 2B:
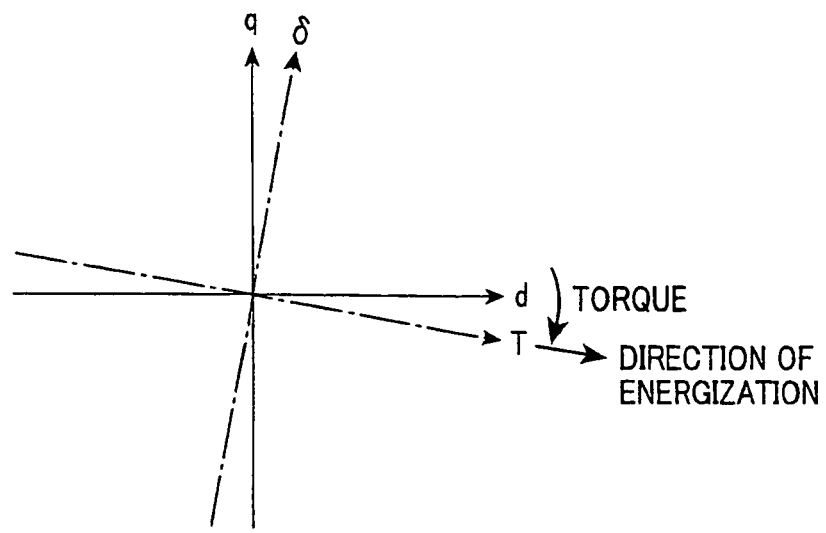

In the absence of the command current corrector 36, an error of the rotation angle θ of the motor-generator 10, as measured by the angular position sensor 20, will cause the phase of current flowing through the motor-generator 10 to deviate or not to match those of the command current idr and iqr, as provided by the command current determining circuit 30, thus resulting in generation of torque in the motor-generator 10, as seen from Eq. (c1). The motor-generator 10, therefore, rotates undesirably. The angular position sensor 20 measures such rotation of the motor-generator 10 and outputs a signal indicative thereof. The d-q transformer 38 and the three-phase transformer 48 sample the rotation angle θ of the motor-generator 10, as measured by the angular position sensor 20, to orient the phase of the current flowing through the motor-generator 10 to the direction as calculated to be the d-axis direction. The motor-generator 10, thus, continues to produce torque, so that it rotates as long as the current flows through the motor-generator 10.

in the presence of the command current corrector 36, the current flowing through the motor-generator 10 is oriented in the feedback mode to the d-axis direction, as calculated based on the start angle θ0. Consequently, if the d-axis which is calculated in error as a y-axis, as demonstrated in FIG. 2(a), based on the start angle θ0 deviates from the true d-axis to an advanced angle, it will cause the torque to be produced and exerted on the rotating shaft of the motor-generator 10 in a direction in which the rotation angle θ is advanced, thereby decreasing a difference in phase between the true d-axis and the d-axis (i.e., the y-axis), as calculated in error based on the start angle θ0. Alternatively, if the d-axis (i.e., the y-axis) which is calculated in error, as demonstrated in FIG. 2(b), deviates from the true d-axis to a retarded angle, it will cause the torque to be produced in a direction in which the rotation angle θ is retarded, thereby decreasing a difference in phase between the true d-axis and the calculated d-axis (i.e., the y-axis), as calculated in error based on the start angle θ0. When the calculated d-axis (i.e., the y-axis) becomes identical with the true d-axis, the torque outputted from the motor-generator 10 will be zero (0). In the example of FIG. 2(a), when the true d-axis overshoots the y-axis to the advanced side due to the torque, as produced by a flow of current in the direction of the calculated d-axis (i.e., the y-axis), the torque will be, as illustrated in FIG. 2(b), oriented in the direction opposite that in FIG. 2(a), thereby decreasing the difference in phase between the true d-axis and the y-axis. In the example of FIG. 2(b), when the true d-axis overshoots the y-axis to the retarded side due to the torque, as produced by a flow of current in the direction of the calculated d-axis (i.e., the y-axis), the torque will be, as illustrated in FIG. 2(a) oriented in the direction opposite that in FIG. 2(b), thereby decreasing the difference in phase between the true d-axis and the y-axis. In this way, the phase of the true d-axis converges on the y-axis.

As apparent from the above discussion, when the capacitor-discharging mode is entered, the control apparatus of this embodiment controls the angle of rotation of the motor-generator 10 so as to stop the motor-generator 10 and thus is capable of decreasing a variation in actual angle of rotation (i.e., the rotation angle θ) of the motor-generator 10 relative to the start angle θ0 in the robust control mode.

The capacitor-discharging mode is preferably performed in the manner to decrease amplitudes of the command voltages (i.e., vector norms of vdr and vqr) with an increase in duration of the capacitor-discharging mode. Alternatively, an upper limit of a percentage modulation in the PWM modulator 50 may be set to 100%. When the percentage modulation exceeds 100%, a value derived by normalizing the command voltage by its amplitude may be compared in magnitude with the carrier. This avoids the over-modulation in the PWM modulator 50.

Figure 3:
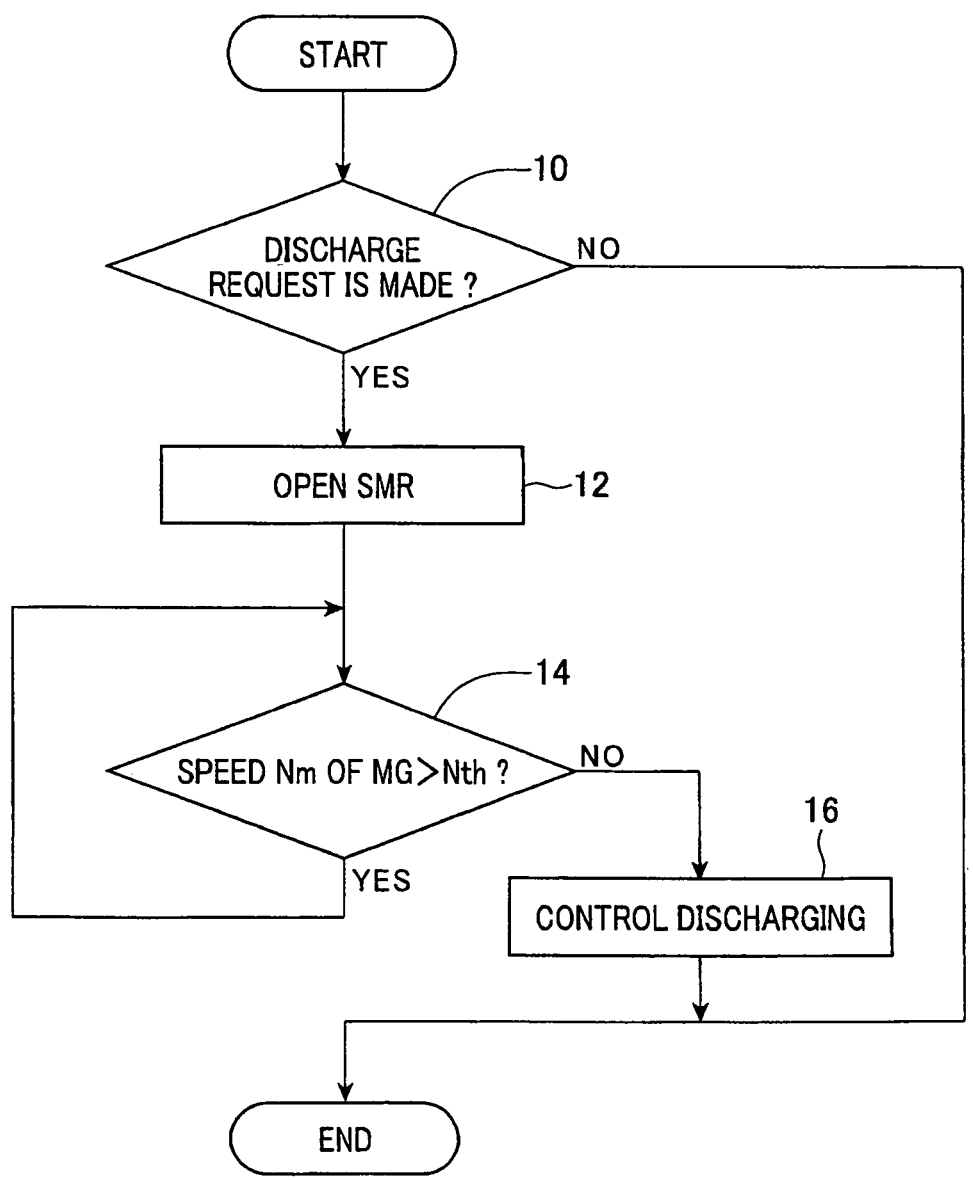
FIG. 3 is a flowchart of a discharge control program to be executed by the control apparatus of FIG. 1 to control discharging of a capacitor.

FIG. 3 is a flowchart of a sequence of logical steps or program to be executed by the control apparatus at a regular interval to control the discharging of the capacitor 14.

After entering the program, the routine proceeds to step 10 wherein it is determined whether a discharge request to discharge the capacitor 14 is made or not, that is, whether the capacitor-discharging mode is to be entered or not. For instance, the discharge request is made when a start switch of the vehicle is turned off. The start switch may be a switch which is to be turned on or off manually by a vehicle operator or replaced with another mechanical or electrical means by which the vehicle operator permits or inhibits the running of the vehicle. The start switch may also be a portable wireless system such as a keyless authorization system. When the portable wireless system is separated from the vehicle by more than a given distance, it may be determined to be turned off, so that that the discharge request is made.

If a YES answer is obtained meaning that the capacitor-discharging mode is requested to be entered, then the routine proceeds to step 12 wherein the relays SMR1 to SMR3 are opened. The routine proceeds to step 14 wherein it is determined whether the speed Nm of the motor-generator 10 is greater than a set speed Nth or not. The set speed Nth is used to determine whether it is possible for the control apparatus to stop the rotation of the motor-generator 10 effectively since start of the capacitor-discharging mode or not. For example, when the motor-generator 10 is rotating upon start of the capacitor-discharging mode, and the control apparatus produces torque in the motor-generator 10 so as to stop the rotation thereof, the motor-generator 10 will be placed in a generating mode. The generated amount of electrical energy increases with an increase in speed of the motor-generator 10. This means that the amount of charge in the capacitor 14 increases. The set speed Nth is selected to be smaller than or equal to an upper limit of the speed of the motor-generator 10 which enables the control apparatus to stop the rotation of the motor-generator 10 effectively upon the start of the capacitor-discharging mode (i.e., the speed of the motor-generator 10 at which an additional amount by which capacitor 14 is charged by the motor-generator 10 is less than a preselected value). The set speed Nth is set to zero (0) in this embodiment.

If a NO answer is obtained in step 14 meaning that the speed Nm of the motor-generator 10 is less than or equal to the set speed Nth, then the routine proceeds to step 16 wherein the start angle θ0 is set in the manner as described above. The control apparatus supplies quadrature current to the motor-generator 10 and discharges the capacitor 14.

If a NO answer is obtained in step 10 or after step 16, the routine terminates.

The control apparatus offers the following beneficial advantages.

The control apparatus corrects the phases of the command currents idr and iqr to be inputted to the feedback controlling circuit the feedback controllers 44 and 46 and the deviation calculators 40 and 42) in a direction opposite that in which the current rotation angle θ of the motor-generator 10 is deviating from the start angle θ0, thereby decreasing a change in direction of a vector of the current in the fixed system of the two-dimensional coordinate due to a change in the rotation angle θ.

The control apparatus starts to control the discharging of the capacitor 14 when the speed Nm of the motor-generator 10 becomes less than or equal to the set speed Nth. This prevents the motor-generator 10 from generating electrical energy undesirably during the capacitance-discharging mode.

The second embodiment will be described below.

The motor-generator 10 is, as described above, equipped with the concentrated phase windings U, V, and W, so that great effects of space harmonics will appear. The relation between the torque T and the currents id and iq flowing through the motor-generator 10 may, thus, not conform to Eq. (1c), as described above, but depend upon the rotation angle θ. Consequently, when the command currents idr and iqr are provided in the same manner as in the first embodiment, it may cause the torque that is not zero (0) to be produced in the motor-generator 10 when an actual rotation angle of the motor-generator 10 agrees just with the start angle θ0.

In order to alleviate the above problem, the control apparatus of this embodiment works to determine the command currents idr and iqr as a function of the start angle θ0.

Figure 4:
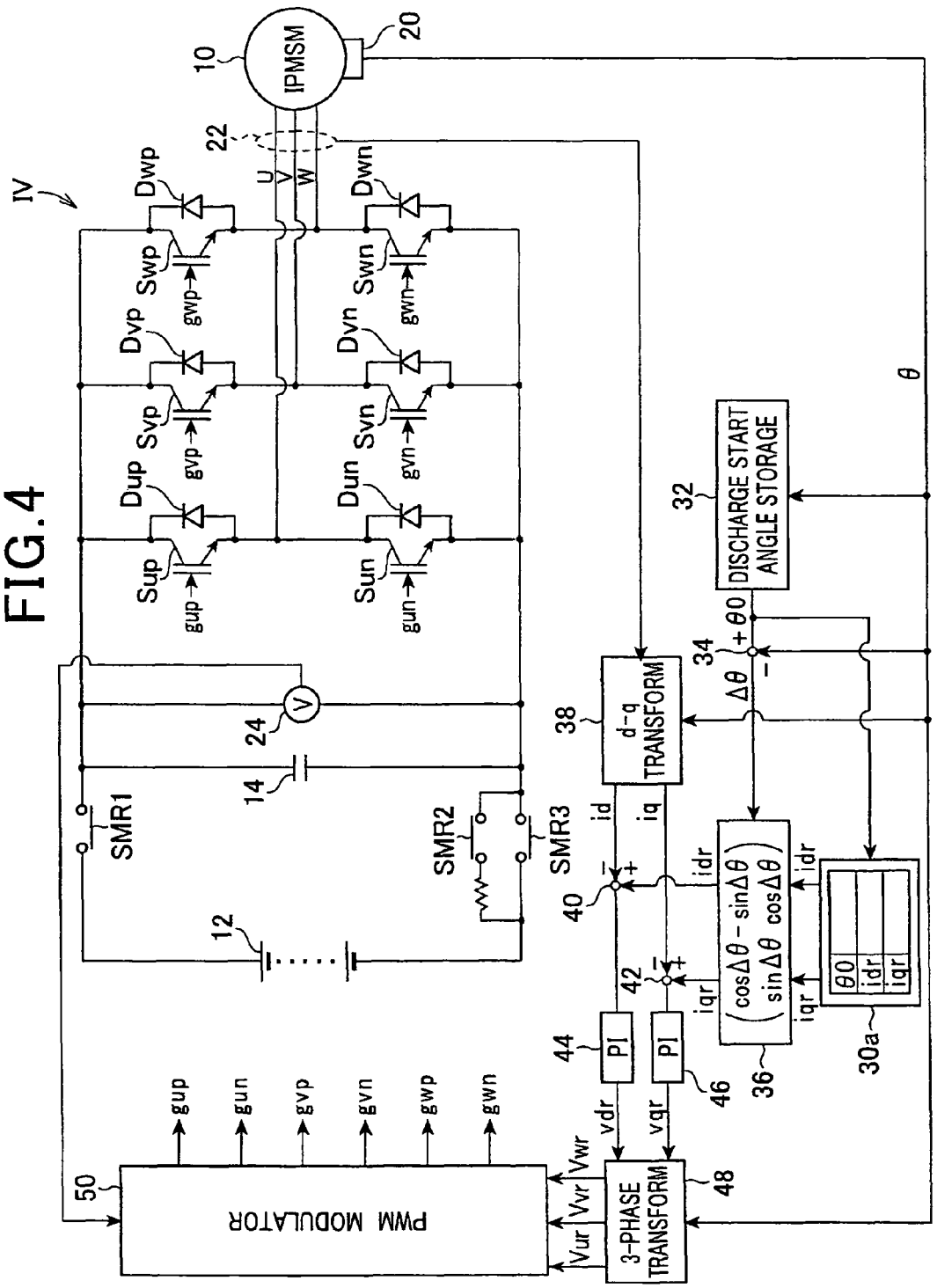
FIG. 4 is a circuit diagram which illustrates a control apparatus according to the second embodiment.

FIG. 4 illustrates the control apparatus of the second embodiment. The same reference numbers as employed in the first embodiment refer to the same parts, and explanation thereof in detail will be omitted here.

The control apparatus includes a command current determining circuit 30a which stores therein maps, one for each of a plurality of ranges of possible values of the start angle θ0, to define the command currents idr and iqr. Specifically, the command current deter ruining circuit 30a calculates at least one of the phase and the magnitude (i.e., amplitude) of each of the command currents idr and iqr by look-up using a corresponding one of the maps based on the start angle θ0. The command current determining circuit 30a is preferably designed to change or determine the phases of the command currents idr and iqr, but may be made to determine the magnitudes thereof to zero the torque to be produced in the motor-generator 10 because solutions of formulas defining relations between the space harmonics-dependent torque and the currents id and iq may be derived where the torque is zero (0), and the phases are fixed.

The d-axis direction, as referred to in this embodiment, is preferably defined to be a phase of current which zeros an average torque to be produced in the motor-generator 10 during running thereof.

As apparent from the above discussion, the control apparatus of this embodiment is different in structure of the command current determining circuit 30a. Specifically, the command current determining circuit 30a works to determine at least one of the phase and the magnitude (i.e., the amplitude) of each of the command currents idr and iqr as a function of the start angle θ0, so that no torque will be produced in the motor-generator 10. Other arrangements are identical with those in the first embodiment, and explanation thereof in detail will be omitted here.

Figure 5:
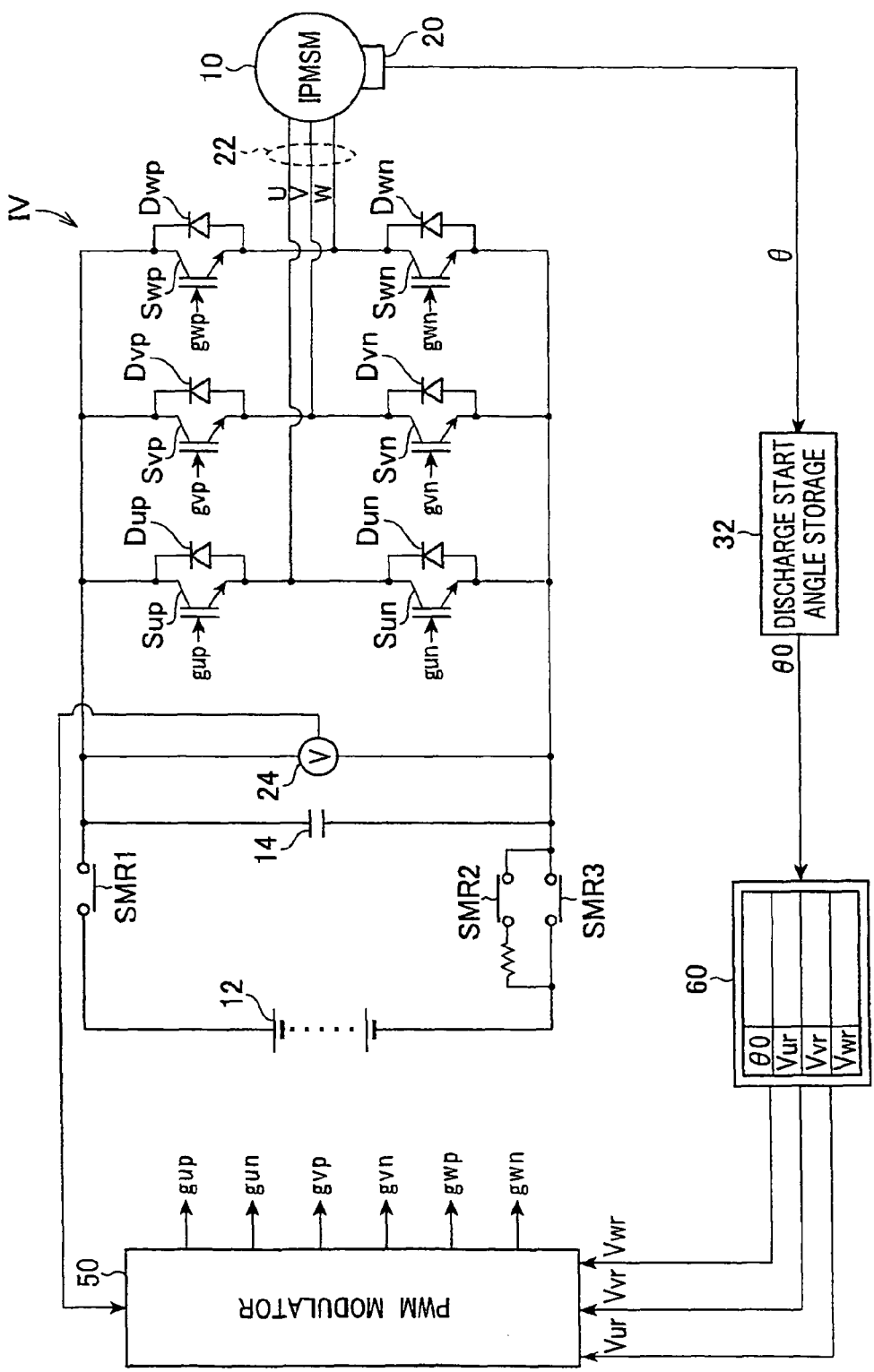
FIG. 5 is a circuit diagram which illustrates a control apparatus according to the third embodiment.

FIG. 5 illustrates the control apparatus according to the third embodiment. The same reference numbers as employed in the first embodiment refer to the same parts, and explanation thereof in detail will be omitted here.

The control apparatus is designed to orient current flowing actually through the motor-generator 10 in an open-loop mode to a direction of a vector of current in the fixed system of the two-dimensional coordinate which is expected to produce no torque in the motor-generator 10 based on the start angle θ0.

The control apparatus includes a discharge command voltage determining circuit 60. The discharge command voltage determining circuit 60 determines the three-phase command voltages Vur, Vvr, and Vwr in the fixed coordinate system based on the start angle θ0 and outputs them to the PWM modulator 50. Each of the command voltages Vur, Vvr, and Vwr is a variable controlled in the open-loop mode so as to orient current actually flowing in the motor-generator 10 to a direction of current in the fixed coordinate system which is expected to produce no torque in the motor-generator 10. For instance, the command voltages Vur, Vvr, and Vwr may be derived by transforming voltages having phases of the command currents idr and iqr which are to be produced in the command current determining circuit 30 of the first embodiment or the command current determining circuit 30a of the second embodiment into voltages in the fixed three-phase coordinate system.

The control apparatus of this embodiment offers a beneficial advantage, as discussed below.

The start angle θ0 is given as an input to the discharge command voltage determining circuit 60 which works to determine the command voltages Vur, Vvr, and Vwr to be applied to a stator (i.e., the U-phase, V-phase, and W-phase windings) of the motor-generator 10 for controlling the directions of vectors of currents in the fixed three-phase coordinate system in the open-loop mode, thereby avoiding changes in direction of vectors of currents flowing through the motor-generator 10 in the fixed three-phase coordinate system which usually arise from a change in rotation angle θ of the motor-generator 10. The use of the open-loop mode facilitates the ease of decreasing noise or vibration occurring due to the discharging of the capacitor 14 or simplifying a control logic of the capacitor-discharging mode. Usually, the feedback control may cause the current vectors to overshoot, so that they oscillate near targets, which creates the noise or vibration of the motor-generator 10. The open-loop control, however, does not cause the oscillation of the current vectors.

Figure 6:
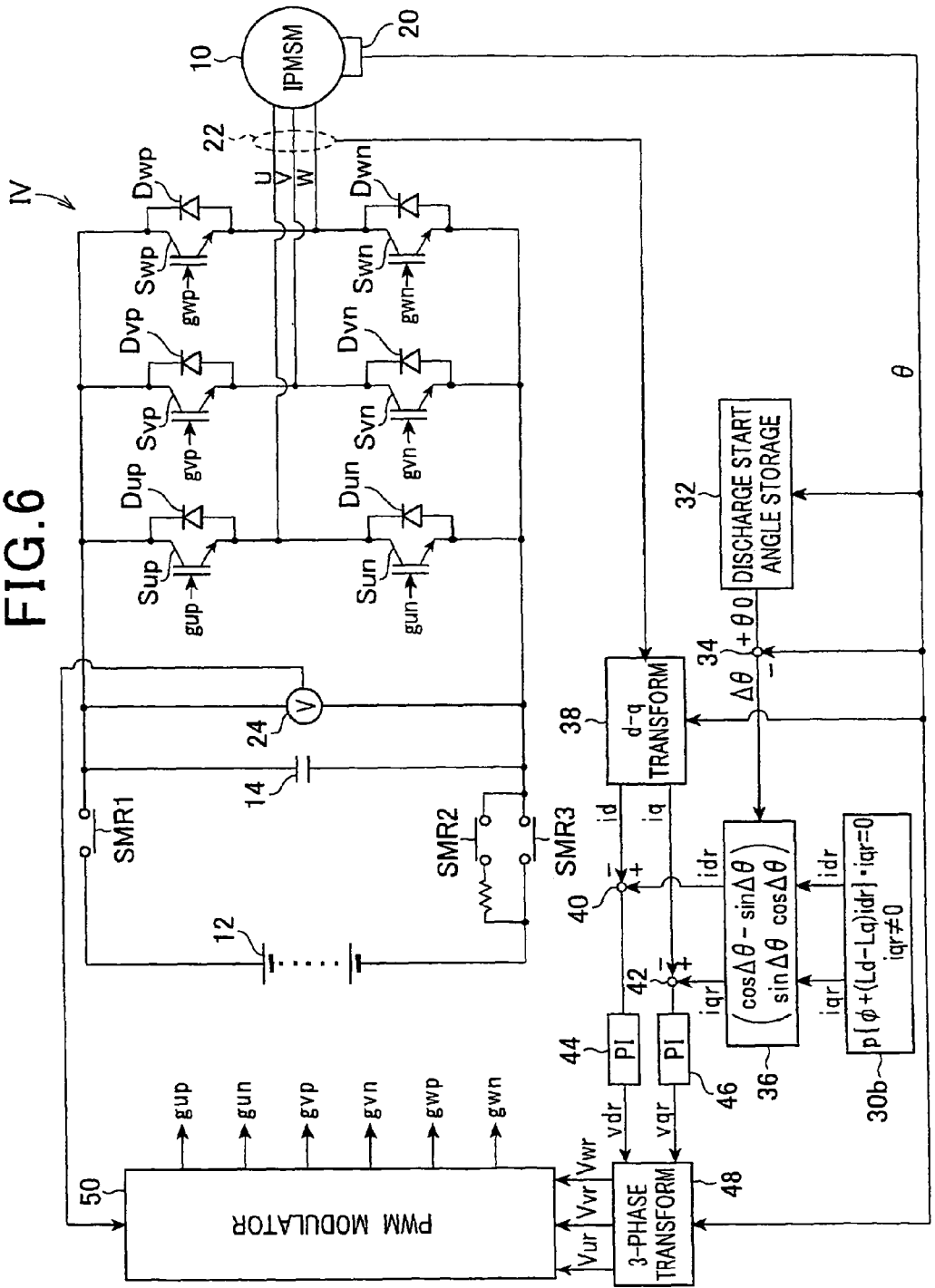
FIG. 6 is a circuit diagram which illustrates a control apparatus according to the fourth embodiment.

FIG. 6 illustrates the control apparatus according to the fourth embodiment. The same reference numbers as employed in the first embodiment refer to the same parts, and explanation thereof in detail will be omitted here.

The control apparatus includes a command current determining circuit 30b which determines the command current iqr on the q-axis not to be zero (0). The command currents idr and iqr are so selected as to zero the torque T in Eq. (1c), as described above.

When torque is produced in the motor-generator 10 by a model error (i.e., an error in the d-axis inductance Ld or the q-axis inductance Lq), it results in an increased variation in rotation angle θ of the motor-generator 10, but however, the actual rotation angle θ of the motor-generator 10 is brought into agreement with a given value.

Each of the first to fourth embodiment may be modified as discussed below.

Command Voltage Fixing Circuit

Instead of a command voltage fixing circuit equipped with the discharge command voltage determining circuit 60, as illustrated in FIG. 5, which is separate from a command voltage determining circuit working to adjust the torque or speed of the motor-generator 10 to other than zero (0) in a normal control mode, the control apparatus of FIG. 1 may be designed to have the command voltage fixing circuit in which the start angle θ0, as stored in the discharge start angle storage 32, is inputted to the three-phase transformer 48, the outputs from the d-q transformer 38 are not updated, in other words, fixed, and the integrating controllers of the feedback controllers 44 and 46 are disenabled, in other words, integrating operations of the feedback controllers 44 and 46 are stopped not to update outputs therefrom. In this structure, when the motor-generator 10 is at the start angle θ0 stored in the discharge start angle storage 32, the direction of a vector of current flowing through the motor-generator 10 relative to the rotor of the motor-generator 10 is so controlled in the open-loop mode as to bring the phases of the command currents idr and iqr, as provided by the command current determining circuit 54, into agreement with directions, as represented in the fixed three-phase coordinate system.

The value of the rotation angle θ of the motor-generator 10 sampled immediately before the start of the energization control of the motor-generator 10 to discharge the capacitor 14 needs not necessarily prepared as an input parameter for the three-phase transformer 48 or the command voltage determining circuit 60. A fixed angle may be used as the input parameter. This also enables a variation in direction of a vector of current flowing through the motor-generator 10 to be controlled or decreased relative to a direction of a vector of current to be provided using the fixed angle, thereby converging the angle of rotation of the motor-generator 10 on a set angle.

Voltage Determining Circuit

The command voltage vqr in the q-axis direction and the command voltage vdr in the d-axis direction which are derived based on the start angle θ0 need not be set to zero and to a positive or a negative value, respectively, so as to orient the command voltages Vur, Vvr, and Vwr to the directions of vectors of currents flowing through the U-phase, the V-phase, and the W-phase windings relative to the rotor of the motor-generator 10 which result in torque of zero (0) in the fixed coordinate system. For instance, the command voltages Vur, Vvr, and Vwr may be oriented to the vectors of the command currents iqr and idr, as derived in the fourth embodiment.

The command voltages Vur, Vvr, and Vwr in the fixed coordinate system need not necessarily be determined and oriented to the vectors of currents which result in torque of zero (0) in the fixed coordinate system, but may be oriented near them so as to allow the angle of rotation of the motor-generator 10 to change slightly during the capacitor-discharging mode.

Command Current Correcting Circuit

The command current corrector 36, as described above, works to change or correct the phases of the command currents idr and iqr by the angular difference Δθ which is derived by subtracting the rotation angle θ of the motor-generator 10, as measured by the angular position sensor 20, from the start angle θ0, as stored in the discharge start angle storage 32, but however, may be designed only to correct the phases of the command currents idr and iqr in a direction opposite that in which the rotation angle θ of the motor-generator 10 is now being moved away from the start angle θ0. The amount of such correction is preferably set near the angular difference Δθ.

Command Current Determining Circuit

The command current determining circuit in the first, second, and fourth embodiment, as described above, works to determine the command current idr along the d-axis to have a positive value and also determine the command currents idr and iqr so as to produce a zero (0) torque, but however, may alternatively be designed to select the command current idr to have a negative value. This may, as apparent from Eq. (1c), result in an impossibility to control or decrease a variation in rotation angle θ of the motor-generator 10 relative to the start angle θ0 depending upon the characteristics of the motor-generator 10 (i.e., a coefficient of flux linkage ψ or a value of the d-axis inductance Ld or the q-axis inductance Lq), but enables the rotation angle θ of the motor-generator 10 to be controlled and fixed to a value away from the start angle θ0 by a given angle (e.g., <360°).

The command current determining circuit may also determine or orient the phases of the command currents idr and iqr so as to produce a degree of torque slightly greater than zero (0) which will result in a small permissible variation in angle of rotation of the motor-generator 10 during the capacitor discharging mode.

DC Power Supply

The capacitor 14 is supplied with electric power from the dc power supply (i.e., the high-voltage battery 12), but may be powered by another source. For instance, the structure of FIG. 1 may be designed to have an electric generator which is connected to the ends of the capacitor 14 through an inverter to supply the power to the capacitor 14. In the case where the electric generator is so engineered to be driven by the internal combustion engine, the control apparatus may be used with systems which do not include the relays SMR1, SMR2, and SMR3 and/or the high-voltage battery 12.

Electric Rotating Machine

The motor-generator 10 may alternatively be equipped with distributed phase windings.

The motor-generator 10 may alternatively be implemented by a surface permanent magnet synchronous motor. In this case, the torque T is given by Eq. (1c) where Ld=Lq. The command current idr along the d-axis which will result in zero (0) torque may be selected to be either positive or negative.

The motor-generator 10 may also be implemented by a field-winding synchronous motor. In this case, the direction of magnetic flux, as produced by the field winding, is defined as the direction of the d-axis. For example, the control apparatus of the third embodiment defines each of the command voltages Vur, Vvr, and Vwr in the form of a plurality of pulses having a direction, as determined in the d-axis direction based on the start angle θ0.

The control apparatus of the above embodiments enters the capacitor-discharging mode and stops the motor-generator 10, but however, may be designed to decrease the speed of the motor-generator 10 as low as possible. For example, when it is required to start discharging the capacitor 14, the control apparatus may decrease the speed of the motor-generator 10 below an upper limit of a range which enables the motor-generator 10 to be stopped effectively after the capacitor-discharging mode is entered (i.e., an upper limit which enables an additional amount by which capacitor 14 has been charged by the motor-generator 10 to be decreased below a preselected value). The control apparatus may alternatively start to discharge the capacitor 14 when the speed of the motor-generator 10 is still above the upper limit.

The high-voltage battery 12 needs not necessarily be connected directly to the input terminals of the inverter IV. For instance, a step-up converter (also called boost converter) equipped with an electric reactor, a switching device joined in parallel to the capacitor 14 through the reactor, a freewheel diode, and a capacitor coupled to the switching device and the freewheel diode which are connected in series may be joined to the input terminals of the inverter IV. In this case, the control apparatus is engineered to control discharging of both the capacitor 14 and the capacitor connected to an output terminal of the step-up converter. The capacitor 14 is to be discharged through the freewheel diode as a drop in voltage at the capacitor of the step-up converter.

The control apparatus in the first, second, and fourth embodiments may alternatively be designed to have an open loop control term(s) for the non-interacting control or the inductor voltage compensation to calculate the command voltages vdr and vqr. When the motor-generator 10 is running at a very low speed, the open loop control term(s) will be zero (0) and thus hardly contribute to the command voltages vdr and vqr even when the rotation angle θ of the motor-generator 10 varies during the capacitor-discharging mode.

Each of the feedback controllers 44 and 46 may alternatively be made by a proportional-plus-integral-plus derivative controller. Instead of each of the feedback controllers 44 and 46, a proportional controller and an integrating controller are provided separately.

The control apparatus may be used with electric vehicles equipped only with an electric rotating machine as a main engine. The motor-generator 10 may alternatively be coupled indirectly to the driven wheels of the vehicle.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A control apparatus for use with an electric power conversion system which is equipped with a dc/ac converter connected to an electric rotating machine and a capacitor joined to input terminals of the dc/ac converter, comprising:
an energizing controlling circuit that controls energization of the electric rotating machine through the dc/ac converter to discharge the capacitor so as to have a charged voltage lower than a given value; and
a current vector change control circuit that controls a change in direction of a vector of current in a fixed coordinate system which flows through the electric rotating machine, the change arising from a change in rotation angle of the electric rotating machine during control of the energization of the electric rotating machine.

2. A control apparatus as set forth in claim 1, wherein the energization controlling circuit includes a voltage determining circuit which works to determine a command voltage to be applied to a stator of the electric rotating machine based on the rotation angle of the electric rotating machine so as to control the direction of the vector of the current in an open loop mode, the energization controlling circuit controlling the dc/ac converter through the command voltage, and wherein the current vector change control circuit serves as a command voltage fixing circuit working to fix a value of the rotation angle of the electric rotating machine that is an input parameter of the voltage determining circuit.

3. A control apparatus as set forth in claim 2, wherein the energization controlling circuit starts controlling the energization of the electric rotating machine when a condition where the electric rotating machine is stopped is met, wherein the command voltage fixing circuit samples a value of the rotation angle of the electric rotating machine before start of control of the energization of the electric rotating machine through the energizing controlling circuit, and wherein the voltage determining circuit works to change a phase of the voltage to be applied to the electric rotating machine as a function of the sampled value of the rotation angle of the electric rotating machine.

4. A control apparatus as set forth in claim 1, wherein the energization controlling circuit includes a command current determining circuit, a feedback controlling circuit, and a voltage transformer, the command current determining circuit working to determine command currents in a rotating coordinate system, the feedback controlling circuit working to determine command voltages in the rotating coordinate system as controlled variables so as to bring components of current, as defined in the rotating coordinate system, which are actually flowing through the electric rotating machine into agreement with the command currents in a feedback mode, the voltage transformer working to transform the command voltages into a command voltage to be applied to a stator of the electric rotating machine through the dc/ac converter based on a measured value of the rotation angle of the electric rotating machine, and wherein the current vector change control circuit is a command voltage corrector which corrects phases of the command currents to be inputted to the feedback controlling circuit in a direction opposite that in which a current value of the rotation angle of the electric rotating machine is changing relative to that at start of control of the energization of the electric rotating machine.

5. A control apparatus as set forth in claim 4, wherein the energization controlling circuit starts controlling the energization of the electric rotating machine when a condition where the electric rotating machine is stopped is met, and wherein the command current determining circuit working to change at least one of a phase or an amplitude of each of the command currents as a function of a value of the rotation angle of the electric rotating machine, as measured before start of control of the energization of the electric rotating machine.

6. A control apparatus as set forth in claim 1, wherein the energization controlling circuit starts controlling the energization of the electric rotating machine when a condition where the electric rotating machine is stopped is met.

7. A control apparatus for use with an electric power conversion system which is equipped with a dc/ac converter connected to an electric rotating machine and a capacitor joined to input terminals of the dc/ac converter, comprising:
an energizing controlling unit configured to control energization of the electric rotating machine through the dc/ac converter to discharge the capacitor so as to have a charged voltage lower than a given value; and
a current vector change control unit configured to control a change in direction of a vector of current in a fixed coordinate system which flows through the electric rotating machine, the change arising from a change in rotation angle of the electric rotating machine during control of the energization of the electric rotating machine.

8. A control apparatus as set forth in claim 7, wherein the energization controlling unit includes a voltage determining unit configured to determine a command voltage to be applied to a stator of the electric rotating machine based on the rotation angle of the electric rotating machine so as to control the direction of the vector of the current in an open loop mode, the energization controlling unit is configured to control the dc/ac converter through the command voltage, and wherein the current vector change control unit serves as a command voltage fixing unit configured to fix a value of the rotation angle of the electric rotating machine that is an input parameter of the voltage determining unit.

9. A control apparatus as set forth in claim 8, wherein the energization controlling unit is configured to start controlling the energization of the electric rotating machine when a condition where the electric rotating machine is stopped is met, wherein the command voltage fixing unit is configured to sample a value of the rotation angle of the electric rotating machine before start of control of the energization of the electric rotating machine through the energizing controlling unit, and wherein the voltage determining unit is configured to change a phase of the voltage to be applied to the electric rotating machine as a function of the sampled value of the rotation angle of the electric rotating machine.

10. A control apparatus as set forth in claim 7, wherein the energization controlling unit includes a command current determining unit, a feedback controlling unit, and a voltage transformer, the command current determining unit is configured to determine command currents in a rotating coordinate system, the feedback controlling unit is configured to determine command voltages in the rotating coordinate system as controlled variables so as to bring components of current, as defined in the rotating coordinate system, which are actually flowing through the electric rotating machine into agreement with the command currents in a feedback mode, the voltage transformer is configured to transform the command voltages into a command voltage to be applied to a stator of the electric rotating machine through the dc/ac converter based on a measured value of the rotation angle of the electric rotating machine, and wherein the current vector change control unit is a command voltage corrector which is configured to correct phases of the command currents to be inputted to the feedback controlling unit in a direction opposite that in which a current value of the rotation angle of the electric rotating machine is changing relative to that at start of control of the energization of the electric rotating machine.

11. A control apparatus as set forth in claim 10, wherein the energization controlling unit is configured to start controlling the energization of the electric rotating machine when a condition where the electric rotating machine is stopped is met, and wherein the command current determining unit is configured to change at least one of a phase or an amplitude of each of the command currents as a function of a value of the rotation angle of the electric rotating machine, as measured before start of control of the energization of the electric rotating machine.

12. A control apparatus as set forth in claim 7, wherein the energization controlling unit is configured to start controlling the energization of the electric rotating machine when a condition where the electric rotating machine is stopped is met.

13. A control apparatus for use with an electric power conversion system which is equipped with a dc/ac converter connected to an electric rotating machine and a capacitor joined to input terminals of the dc/ac converter, comprising:
a computer processing system, comprising a computer processor, the computer processing system being configured to:

control energization of the electric rotating machine through the dc/ac converter to discharge the capacitor so as to have a charged voltage lower than a given value; and control a change in direction of a vector of current in a fixed coordinate system which flows through the electric rotating machine, the change arising from a change in rotation angle of the electric rotating machine during control of the energization of the electric rotating machine.

14. A control apparatus as set forth in claim 13, wherein the computer processing system is further configured to:

determine a command voltage to be applied to a stator of the electric rotating machine based on the rotation angle of the electric rotating machine so as to control the direction of the vector of the current in an open loop mode;

control the dc/ac converter through the command voltage; and fix a value of the rotation angle of the electric rotating machine that is an input parameter for a part of the computer processing system.

15. A control apparatus as set forth in claim 14, wherein the computer processing system is further configured to:

start controlling the energization of the electric rotating machine when a condition where the electric rotating machine is stopped is met;

sample a value of the rotation angle of the electric rotating machine before start of control of the energization of the electric rotating machine;

change a phase of the voltage to be applied to the electric rotating machine as a function of the sampled value of the rotation angle of the electric rotating machine.

16. A control apparatus as set forth in claim 13, wherein the computer processing system is further configured to:

determine command currents in a rotating coordinate system;

determine command voltages in the rotating coordinate system as controlled variables so as to bring components of current, as defined in the rotating coordinate system, which are actually flowing through the electric rotating machine into agreement with the command currents in a feedback mode;

transform the command voltages into a command voltage to be applied to a stator of the electric rotating machine through the dc/ac converter based on a measured value of the rotation angle of the electric rotating machine; and correct phases of the command currents in a direction opposite that in which a current value of the rotation angle of the electric rotating machine is changing relative to that at start of control of the energization of the electric rotating machine.

17. A control apparatus as set forth in claim 16, wherein the computer processing system is further configured to:

start controlling the energization of the electric rotating machine when a condition where the electric rotating machine is stopped is met; and change at least one of a phase or an amplitude of each of the command currents as a function of a value of the rotation angle of the electric rotating machine, as measured before start of control of the energization of the electric rotating machine.

18. A control apparatus as set forth in claim 13, wherein the computer processing system is further configured to start controlling the energization of the electric rotating machine when a condition where the electric rotating machine is stopped is met.

19. A method of controlling an electric power conversion system which is equipped with a dc/ac converter connected to an electric rotating machine and a capacitor joined to input terminals of the dc/ac converter, the method comprising:

controlling energization of the electric rotating machine through the dc/ac converter to discharge the capacitor so as to have a charged voltage lower than a given value; and controlling a change in direction of a vector of current in a fixed coordinate system which flows through the electric rotating machine, the change arising from a change in rotation angle of the electric rotating machine during control of the energization of the electric rotating machine.

* * * * *